United States Patent
Pompéi

[11] 3,920,533
[45] Nov. 18, 1975

[54] LIGHT FILTER AND PROCESS FOR PRODUCING THE SAME

[75] Inventor: Jean Pompéi, Noisy-le-Roi, France

[73] Assignee: R.T.C. La Radiotechnique-Compelec, Suresnes, France

[22] Filed: Apr. 10, 1974

[21] Appl. No.: 459,827

[30] Foreign Application Priority Data
Apr. 12, 1973  France ............................. 73.13277

[52] U.S. Cl. ............... 204/192; 117/33.3; 117/71 R; 117/124 A; 117/124 C; 350/1; 350/311
[51] Int. Cl. ....................... C23c 15/00; B29d 11/00
[58] Field of Search ............ 204/192, 298; 117/33.3

[56] References Cited
UNITED STATES PATENTS

| | | | |
|---|---|---|---|
| 2,676,117 | 4/1954 | Colbert et al. .................. | 117/124 B |
| 2,825,687 | 3/1958 | Preston et al. ................... | 204/192 |
| 3,087,831 | 4/1963 | Browne ............................. | 117/35 |
| 3,505,092 | 4/1970 | Ryan et al. ....................... | 117/33.3 |
| 3,720,541 | 3/1973 | King ................................. | 117/211 |
| 3,773,639 | 11/1973 | Masotti ............................ | 204/192 |
| 3,793,167 | 2/1974 | Glaser .............................. | 204/298 |
| 3,798,146 | 3/1974 | Wan et al. ........................ | 204/192 |
| 3,826,728 | 7/1974 | Chambers et al. .............. | 204/192 |

FOREIGN PATENTS OR APPLICATIONS

| | | | |
|---|---|---|---|
| 89,651 | 12/1958 | Netherlands ..................... | 204/192 |
| 1,058,805 | 6/1959 | Germany ......................... | 204/192 |

*Primary Examiner*—John H. Mack
*Assistant Examiner*—Aaron Weisstuch
*Attorney, Agent, or Firm*—Daniel M. Rosen

[57] ABSTRACT

A light filter is disclosed which is adapted for transmitting luminous energy while reflecting thermal energy. The filter comprises a substrate body having a thin light filtering layer of metal deposited on one surface of the substrate body and a protective film of indium oxide coated on the filtering layer. An improved cathodic spraying process is disclosed for fabricating the light filter, wherein the layers are successively applied by advancing the substrate between first and second target electrodes consisting respectively of gold-based bismuth alloy and indium. The process may be conducted in dry air under reduced pressure.

6 Claims, 3 Drawing Figures

LIGHT FILTER AND PROCESS FOR PRODUCING THE SAME

The present invention relates to a plate which is transparent to the luminous energy of the solar spectrum comprising at least one thin filtering layer of metallic nature, deposited on at least one surface of the plate. The invention also relates to a process for fabricating the plate. More specifically, the invention relates to "anti-heat" panes on which there is deposited a thin layer of a metal such as, for example, gold, silver or copper adapted to reflect thermal radiation of the infrared range. However, it is understood that the invention also extends to any type of light filter with a thin metallic layer, regardless of the composition of the transparent plate constituting the support, the surface area and thickness of this plate.

A thin layer metallic deposit, which is the selective active element of a filtering device of the type referred to, has the disadvantage of being very fragile, either mechanically, which is more or less the case for all metals or alloys deposited on glass, or mechanically and chemically, which is the case, for example, for copper and silver. The defect of fragility is even more troublesome when used as glazing in construction because the glazing must be cleaned regularly.

A lack of knowledge of suitable techniques for producing a deposition of suitable protective coatings that are both refractory and transparent and which adhere perfectly to the underlying thin metallic layer has resulted in superposing on the plate supporting the thin metallic layer, a second bare transparent plate, which thus makes it possible to isolate the thin metallic layer as a sandwich between the two plates. Glazing or filtering devices of this construction and having a large surface area are relatively heavy, difficult to produce, and, in addition, are very high in cost.

Alternatively, attempts have been made to deposit vitreous protective coatings such as, for example, coatings of silicon monoxide or dioxide, which would eliminate the need for the superposition of two transparent plates. It has been found, in most cases, that a good adhesion to the thin metallic layer remains subordinate to the presence of intermediate bonding layers made of various metals or alloys. Thus, in French Pat. No. 2,037,986, for example, it is proposed to insert between the thin layer of gold, silver or copper and the surface protective coating of glass or of quartz, a layer of chromium with another layer of chromium being deposited on the glass substrate to promote the adhesion of the thin layer. Emphasis is placed on the excellent adhesion and the abrasion resistance of the composite chromium-gold-chromium-glass layer.

However, this composite layer has the disadvantage of being very absorbent, because of the presence of two layers of chromium. Furthermore, the preparation of such a composite layer of four successive levels cannot be carried out without difficulties, particularly if one uses — as is provided in the above-mentioned patent — both cathodic spraying and vacuum vaporization methods, which implies the establishment of different operating conditions, particularly of different pressures, in accordance with the sequences of deposition. In addition, when panes several square meters in surface area are involved, the production difficulties are increased even further.

Accordingly, the present invention has as its object the production of plates filtering luminous radiation of the solar spectrum, particularly of panes reflecting the thermal radiation of this spectrum, provided with a protection coating deposited directly on the active thin layer, a coating resistant to atmospheric, mechanical, and chemical agents and adhering perfectly to the said thin layer.

The invention takes into consideration, in particular, the possibilities of cathodic spraying for the production of layers which adhere perfectly to each other.

In accordance with the features of this invention, a body having an electromagnetic, radiant energy transmission characteristic is provided comprising a transparent substrate body having a surface thereof, a thin filtering layer formed of metal and supported on said surface of said body, said filtering layer being relatively transmissive to radiant energy incident thereon over at least a portion of the luminous part of the electromagnetic spectrum and relatively non-transmissive to radiant energy incident thereon over at least a portion of the non-luminous part of the electromagnetic spectrum, and a film of indium oxide positioned on said thin filtering layer. The body thus described is particularly advantageous for use as a heat pane wherein the electromagnetic radiation represents solar energy and the body transmits radiation in the luminous or visible light portion of the electromagnetic spectrum while reflecting thermal energy occurring in the non-luminous portion of the spectrum and particularly in the infrared portion of the spectrum.

The deposition of indium oxide as a protective coating on the thin filtering layer results in several advantages. Indium oxide is a substance which is practically resistant to any chemical attack. It is also extremely hard and has a very high abrasion resistance; it does not scratch easily. This substance therefore constitutes an advantageous material as a protective coating on a metallized pane, even at a very low thickness. Furthermore, indium oxide adheres perfectly to gold, silver and copper and eliminates the prior necessity for inserting a thin layer of a bonding material.

The presence of the indium oxide film does not appreciably change the spectral transmission characteristic curve in the visible region of the underlying filter layer, to the extent that this film is relatively thin and the thicknesses of the filter layer and indium oxide film lay within predetermined ranges of thicknesses. On the other hand, it is found that the reflecting power for infrared radiation is substantially better with a combined deposit of gold and indium oxide than with a deposit of gold alone.

It is possible, by increasing the thickness of the indium oxide film to obtain as would be the case with any other metal oxide, a change in the transmission curve; thus, with the thin layer consisting, for example, of gold, one can, depending on the thickness of the indium oxide, obtain a transmission curve clearly favoring green, while the reflected light is predominantly red. The deposit of a metal and indium oxide is further advantageous in that is is electrically conductive, provided that the indium oxide is conductive, which can be easily obtained and which makes it possible to expand the range of applications of the present invention.

In accordance with further aspects of the invention, an improved process is provided for the preparation of filtering device of the type described which makes use entirely of cathodic spraying.

There is disclosed in French Pat. No. 2,054,496 of the applicant, a process for the deposition of a thin layer of gold by cathodic spraying of a target on which the gold is present in the form of an alloy with bismuth (90 to 98 percent of gold and 2 to 10 percent of bismuth, by weight). According to the disclosure of this patent, a discharge gas is employed comprising a mixture of oxygen and nitrogen, or quite simply of air. It has been observed that a deposit of indium oxide may be obtained by reactive cathodic spraying of an indium target in an air atmosphere, under exactly the same operating conditions as for the formation of a thin layer of gold from a gold-bismuth target. This results in the use of a greatly simplified and very rapid process for the formation of a deposit of gold and indium oxide.

To produce plates or panes which reflect thermal radiation, it is therefore sufficient, in a cathodic spraying installation of sufficient size, to convey the bare plates or panes past two targets, one target being formed of gold-bismuth and the other target formed of indium. The targets are positioned one after the other, and in a suitable order in accordance with the direction of movement imparted to the plates or panes. By adjusting the rate of movement of the plates or panes and the width and number of the targets, one can easily obtain deposits of the desired thickness of each of the constituents, for given discharge conditions.

One of the advantages of the process according to the invention lies in the ease with which the adhesion of the gold layer can be increased. It is sufficient to place an indium target ahead of the gold-bismuth target in the process in order to produce a sub-layer of indium oxide on the pane.

The present process also makes possible the relatively easy production of a multi-layer filter comprising a plurality of elementary deposits formed of a layer of gold resting on a layer of indium oxide, protected by a surface layer of indium oxide.

The operating conditions are identical for each of the metals, gold or indium; it is sufficient to arrange a sufficient number of targets in a suitable manner.

It is clear that the present invention also relates to transparent plates comprising a sub-layer of indium oxide placed under the filtering layer of gold, which is itself coated with a film of indium oxide, as well as transparent plates comprising a plurality of elementary deposits of gold and indium oxide placed under a surface film of indium oxide.

In the case where the active thin layer consists of silver or copper, the procedure is more delicate because of the fact that these metals are oxidizable. This requires, in principle, the use of a neutral atmosphere during the deposition of the thin metal layer. However, as far as silver is concerned, one advantageously operates by spraying of a target consisting of an insertion alloy containing between 95 and 98 percent of silver and, for example, bismuth or tin in the proportion of 2 to 5 percent, by means of a method closely copied from that used for a deposition of gold from a target consisting of a gold-bismuth insertion alloy, such as has been described in the above-mentioned French Pat. No. 2,054,496.

With the target consisting, for example, of silver-bismuth, the starting atmosphere in the spraying enclosure then contains argon to which is added a very small quantity of oxygen (residual oxygen present in the enclosure in the adsorbed form). The oxygen alloys with the bismuth and forms, from the start, a layer of bismuth trioxide, constituting the support layer, on the substrate (reactive phase of the spraying). After the oxygen has been completely absorbed, a transfer of silver from the target to the substrate then takes place (non-reactive phase of the spraying).

The subsequent deposition of a film of indium oxide requires an enrichment of the enclosure atmosphere by oxygen, as soon as the thickness of the deposit of the active thin layer is considered to be sufficient.

It should be noted that the structure of the deposit (metal/metal oxide) or (metal oxide/metal/metal oxide) has already been achieved for the production of panes reflecting infrared radiation. A structure of this type is described, for example, in French Pat. No. 1,513,724. However, it should be noted, on the one hand, that the structures proposed in this patent aim solely at changing the spectral response curves of the deposits and, on the other hand, that the precise case of indium oxide used as a protective surface coating on a metallic layer does not appear to have been foreseen up to now, to the applicant's knowledge, and, finally, that the deposits of various oxides produced principally by vacuum evaporation or by chemical means, or by high frequency cathodic spraying of oxide targets, have a mediocre adhesion and low strength and are frequently permeable.

The following description, in connection with the attached drawings, provided as non-limiting examples, will provide a good understanding of how the invention may be carried out.

Figure 1:
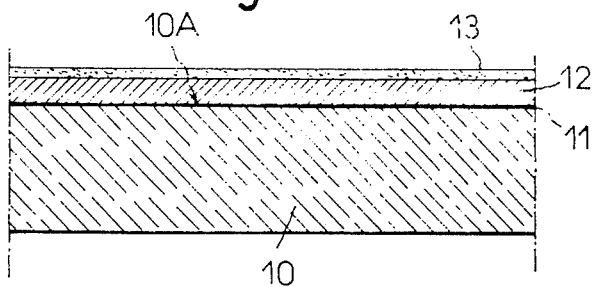
FIGS. 1 and 2 are schematic representations, in a transverse section of plates with a selective transparency comprising a surface protective coating of indium oxide according to the invention.
Figure 2:
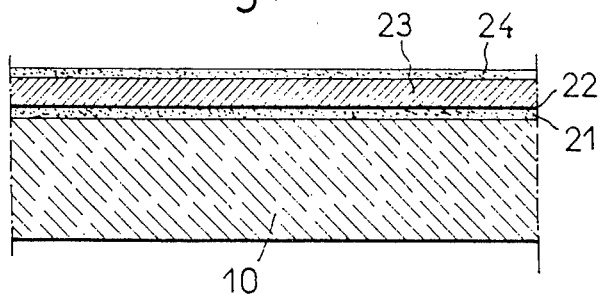

The transparent plate designated as 10 in FIGS. 1 and 2 is made of a dielectric material. In the case of the manufacture of panes reflecting infrared radiation, this material is glass. But it is understood that the invention may be applied to any dielectric substrate, provided that the said substrate has the necessary quality for withstanding, without mechanical or chemical change, the effect of the electronic and ionic bombardment that it must undergo in the cathodic spraying enclosure.

On the upper surface 10A of plate 10, there have been grown, successively, a sub-layer of bismuth trioxide 11, a layer of pure gold 12, and a protective film 13 of indium oxide.

The growth of this coating was obtained by cathodic spraying carried out in a spraying device of diode configuration, initially between a target electrode covered at the surface with a layer of gold-bismuth alloy and a collecting electrode supporting the plate 10, and then between a second target covered at the surface with a layer of indium and the said collecting electrode. The complete coating was formed in a single operational sequence, that is, without opening the spraying enclosure and without changing the previously established operating conditions.

Advantageously, and if plates of large dimensions are involved, the collecting electrode and the plate 10 are given a translational motion at a regular speed, which causes them to move passed the target electrodes placed one after the other. It is known that spraying devices equipped for providing movements of this type have already been described in previous patent applications.

The dimensions of the spraying enclosure and those of the elements that it shelters must, of course, be appropriate to those of the plates to be covered, but the area factor is not a quantity capable of influencing the discharge conditions in a significant manner.

The distance between the target electrodes and the collecting electrode is the same regardless of the nature of the target. The spraying of targets of gold-bismuth and indium takes place simultaneously; however, a minimum space equal at least to the distance separating the said targets from the collecting electrode must be maintained between the two targets, unless a screening electrode connected to the ground of the installation is placed between them.

The pressure in the enclosure is established and stabilized at a value preferably in the range of about $1 \times 10^{-2}$ to $1 \times 10^{-3}$ Torr and preferably about $5 \times 10^{-3}$ Torr, with the discharge atmosphere consisting of dry air. The supply voltage is preferably in the range of about 2,000 to 4,000 volts DC and preferably about 3,000 volts DC involving the passage of an average current with a density preferably in the range of about 0.2 to 0.3 ma/cm$^2$ and preferably about 0.25 ma/cm$^2$ of target for a target collecting electrode distance preferably in the range of about 50 to 70 mm and preferably about 60 mm. The current densities are practically the same whether the target electrode is made of gold-bismuth or of indium.

As was explained in the applicant's above-mentioned French Pat. No. 2,054,496, there is formed on the plate 10, during a first spraying time of the gold-bismuth target electrode, a bonding layer 11 of bismuth trioxide, and the gold layer 12 growth thereafter. A surface film 13 of indium oxide is finally deposited on the thin layer of gold 12.

The production of a deposit of indium oxide by cathodic spraying of an indium target in an oxygen-containing atmosphere is known. An exemplary technique is disclosed, for example, in French Pat. No. 2,091,956. However, it should be noted that, in the processes described hitherto, the amount of oxygen used was metered, whereas in the process according to the invention no metering is necessary, with the atmosphere advantageously consisting quite simply of air.

The different deposits produced on the plate 10 may have variable thicknesses in accordance with the residence times in front of each of the two gold-bismuth and indium targets, and also in accordance with the translational speed of the plate 10 and the width of the targets in parallel to the direction of passage in the case of an installation with a mobile collecting electrode.

For panes reflecting infrared radiation, the average thickness of the thin layer of gold 12 is preferably in the range of about $1 \times 10^{-2}$ to $2 \times 10^{-2}$ micron and preferably about $1.5 \times 10^{-2}$ micron; the indium oxide film 13 has an average thickness preferably in the range of about $5 \times 10^{-2}$ to $3 \times 10^{-1}$ micron and preferably about $1 \times 10^{-1}$ micron; and the bonding layer 11 in all cases has an average thickness preferably in the range of about $5 \times 10^{-4}$ to $2 \times 10^{-3}$ micron and preferably about $1 \times 10^{-3}$ micron.

The cathodic spraying operation which makes it possible to produce a coating of the dimensions indicated above is extremely rapid — of the order of 2 minutes to 2 minutes 30 seconds — and this speed represents a certain advantage on the industrial level. Furthermore, it can be appreciated that the pressure at which the spraying is carried out and the composition of the atmosphere remain unchanged from the start to the finish of the operating process. Also, the pressure under which the discharge is carried out is relatively high; it is achieved much more rapidly than a pressure of the order of $10^{-5}$ to $10^{-6}$ Torr necessary for an evaporation, particularly when the operating enclosure must be large.

When gold is replaced by silver, the operating process is less rapid. The two operations of deposition of the thin layer of silver and of the indium oxide film must then be separated with the discharge atmosphere being different for each of these operations.

For silver, one operates, for example, with a target made of an alloy of silver (95 to 98 percent) and bismuth (2 to 5 percent) by weight. The atmosphere is a neutral gas, preferably argon. The other operating parameters are substantially the same as those used for gold and indicated above, i.e., DC preferred supply voltage of 3,000 volts in an operating range of 2,000 to 4,000 volts and preferably an inter-electrode distance of 60 mm in an operating range of 50 to 70 mm and a preferred pressure of $5 \times 10^{-3}$ Torr in an operative range of $10^{-2}$ to $10^{-3}$ Torr.

Initially, there is formed on the plate 10 a bonding layer 11 of bismuth trioxide formed by combination of bismuth particles with the residual oxygen still present in the enclosure in the adsorbed form. The thin layer 12 of pure silver then grows on the layer 11. The process of growth of the assembly of the bismuth trioxide layer 11 and the thin silver layer 12 is practically comparable to that of the assembly of a bismuth trioxide layer 11 and a thin gold layer 12; the result would be analogous with targets consisting of insertion alloys of a different composition, with a very marked predominance of silver, in which the alloyed metal must have a molecular weight greater than that of silver. One could, for example, also use an alloy of silver (95 to 98 percent) and tin (2 to 5 percent) by weight.

In a second period, with the deposition of the silver layer 12 being complete, the enclosure is supplied with a mixture of 94 percent (93.5 to 94.5 percent) of argon and 6 percent (5.5 to 6.5 percent) of oxygen, by volume, maintaining the pressure at $10^{-2}$ to $10^{-3}$ Torr, and the discharge is initiated at the indium target. The indium oxide film 13 is then formed. It is, of course, suitable, starting from the time when oxygen is introduced into the enclosure, to rapidly initiate the discharge with the indium target, in order to prevent the freshly deposited silver layer 12 from starting to oxidize.

The possibilities provided by the invention may, of course, be extended to multi-layer deposits, with the final deposit in all cases being an indium oxide film playing a protective role.

Advantageously, when the thin metallic layer consists of gold, a structure such as that shown in FIG. 2 can be used, in which the thin layer of gold 23 is sandwiched between two deposits of indium oxide: a sub-layer 21, which, with the bismuth trioxide layer 22, constitutes and reinforces the bond between the layer 23 and the transparent plate 10, and a surface film 24.

The production of a structure of this type, by the process of simultaneous spraying of gold-bismuth and indium targets described above, simply requires the placement, facing the collecting electrode supporting the plate 10, of first an indium target electrode, then a gold-bismuth target electrode, and finally a second indium target electrode, with every pair of these targets being separated by a distance of 50 to 70 mm. The assembly of the layers 21, 22, 23 and 24 in which the successive deposits have the following thicknesses:

from $5 \times 10^{-2}$ to $2 \times 10^{-1}\mu$ (preferably $10^{-1}\mu$) for the deposit 21,
from $5 \times 10^{-4}$ to $2 \times 10^{-3}\mu$ (preferably $10^{-1}\mu$) for the deposit 22,
from $10^{-2}$ to $2 \times 10^{-2}\mu$ (preferably $1.5 \times 10^{-2}\mu$) for deposit 23, and
$5 \times 10^{-2}$ to $2 \times 10^{-1}\mu$ (preferably $10^{-1}\mu$) for the deposit 24, has proved to have interesting properties as far as the reflective power for infrared radiation is concerned.

Figure 3:
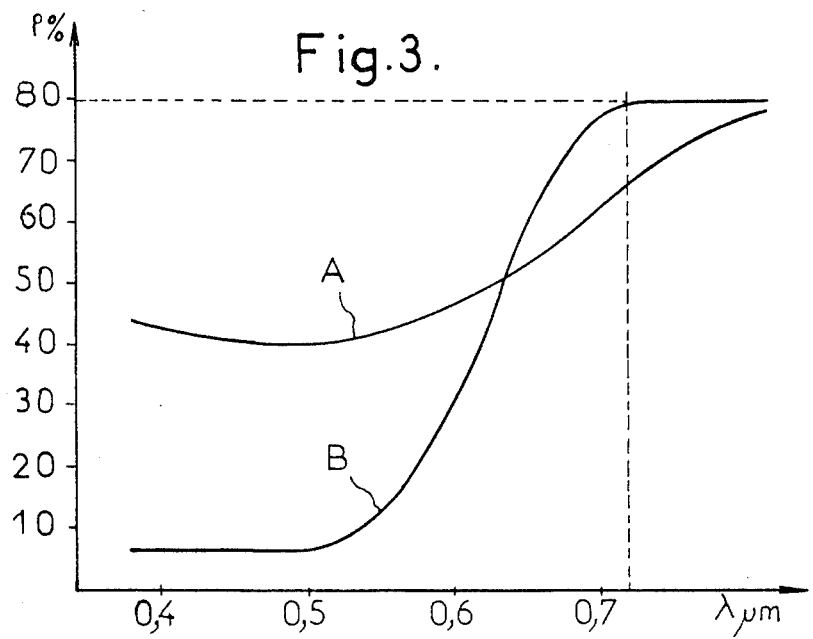
FIG. 3 is a comparative drawing showing the reflective power, in percent of the total light received, of a metallic deposit of gold alone and a deposit of gold inserted between two films of indium oxide as a function of the wavelength of the incident radiation.

As an indication, the diagram of FIG. 3 compares the performances, from the point of view of reflective power, between a reflecting pane comprising a thin layer of gold-bismuth trioxide with a total thickness of $1.5 \times 10^{-2}\mu$ (curve A) and another pane of the same nature coated in the way described with respect to FIG. 2 (curve B).

It is found that the transmission in the visible range is better for curve B (only 6 percent of the incident light is reflected for wavelengths between 0.400 and $0.520\mu$) than for curve A (average reflection rate of the order of 40 percent) and that the reflective power in the near infrared is clearly improved by the addition of indium oxide (the reflection rate reaches 80 percent as soon as the wavelength of $0.7\mu$ is exceeded whereas, for the same spectral region, the rate of reflection is only 65 percent with gold alone).

A composite layer, such as those described with respect to FIGS. 1 and 2, has a certain electrical conductivity. It should be pointed out that this electrical conductivity may be improved by replacing the target of pure indium by a target of an alloy of indium (79.5 to 80.5 percent) and tin (19.5 to 20.5 percent), with the discharge conditions remaining otherwise identical. The optical characteristics of the composite layer are practically comparable whether the target is made of indium or of indium + tin; however, the presence of tin produces a slight increase in the reflective index.

There has thus been described an improved light filter which advantageously exhibits enhanced abrasion proof characteristics for protecting a thin, metal light filtering film which is deposited on a transparent substrate. In addition, enhanced bonding characteristics and light filtering properties are provided and disclosed. An improved process for the cathodic spraying of the films and layers is also provided.

While there have been disclosed particular configurations and arrangements of properties and processes described herein, it will be apparent to those skilled in the art that variations may be made herein without departing from the spirit of the invention and the scope of the appended claims.

What is claimed is:
1. A cathodic spraying process for the production of a body which is relatively transmissive to radiant energy incident thereon over at least a portion of the luminous part of the electromagnetic spectrum and which is relatively non-transmissive to radiant energy incident thereon over at least a portion of the non-luminous part of the electromagnetic spectrum comprising the steps of:
   positioning a transparent substrate body on a collecting electrode in an enclosed volume;
   successively advancing the collecting electrode between first and second target electrodes, wherein said first target electrode is formed of an alloy consisting of about between 90 and 98 percent gold and about 2 to 10 percent bismuth by weight and said second target electrode consists essentially of indium, the collecting electrode and the target electrodes are separated by a distance in the range of about 50 to 70 mm, a potential difference in the range of about 500to 70 mm, a potential differencne in the range of about 2,000 to 4,000 volts DC is applied between target and collector electrodes, and a pressure in the range of $1 \times 10^{-2}$ to $1 \times 10^{-3}$ torr is established in the enclosed volume in which said cathodic spraying occurs.

2. The process of claim 1 wherein said electrodes are preferably separated by a distance of about 60 mm, a potential preferably of about 3,000 volts DC is applied between said target and collector electrodes and a pressure of $5 \times 10^{-3}$ torr is established.

3. The process of claim 1 wherein the collecting electrode supporting the substrate body transports the substrate body successively and regularly before each of the target electrodes positioned one after the other, and wherein a discharge is maintained both on the gold-bismuth and indium targets whereby deposits of gold and of indium oxide are successively produced without interruption in the discharge.

4. A process according to claim 3 wherein said target electrodes are spaced apart by a distance at least equal to the distance separating said targets from the collecting electrode.

5. A process according to claim 1 wherein the indium of said target electrode is alloyed with tin in the proportion by weight of about 79.5 to 80.5 percent of indium and about 19.5 to 20.5 percent of tin.

6. The process of claim 1 wherein the discharge atmosphere consists essentially of dry air.

* * * * *

UNITED STATES PATENT AND TRADEMARK OFFICE
CERTIFICATE OF CORRECTION

PATENT NO. : 3,920,533
DATED : November 18, 1975
INVENTOR(S) : Jean Pompei

It is certified that error appears in the above-identified patent and that said Letters Patent are hereby corrected as shown below:

Column 7, line 9, after "preferably" change "$10^{-1}$" to read --$10^{-3}$--.

Column 8, lines 25 and 26, delete " 500 to 70 mm, a potential difference in the range of about".

Signed and Sealed this

Twenty-eighth Day of December 1976

[SEAL]

Attest:

RUTH C. MASON
*Attesting Officer*

C. MARSHALL DANN
*Commissioner of Patents and Trademarks*